大Patent# United States Patent [19]

Waszkiewicz

[11] Patent Number: 4,812,646
[45] Date of Patent: Mar. 14, 1989

[54] OPTICAL FIBER INITIALIZATION METHOD AND APPARATUS

[75] Inventor: Paul Waszkiewicz, Agoura Hills, Calif.

[73] Assignee: Photon Devices, Ltd., Newport Beach, Calif.

[21] Appl. No.: 116,554

[22] Filed: Nov. 3, 1987

[51] Int. Cl.⁴ .............................. G02B 6/06; H01J 5/16
[52] U.S. Cl. .................................... 250/227; 350/96.25
[58] Field of Search ................ 250/227, 578; 340/794; 350/96.24, 96.25, 96.27, 96.29; 355/1, 3 BE; 358/901

[56] References Cited

U.S. PATENT DOCUMENTS

| | | | |
|---|---|---|---|
| 3,184,732 | 5/1965 | Haynes | 350/96.28 |
| 3,273,445 | 9/1966 | Siegmund | 350/96.27 |
| 3,717,762 | 2/1973 | Grenier et al. | 250/227 |
| 4,057,338 | 11/1977 | Yevick | 355/1 |
| 4,549,175 | 10/1985 | Rokunohe et al. | 340/794 |
| 4,570,063 | 2/1986 | De Bie et al. | 350/96.25 |
| 4,623,788 | 11/1986 | Kern et al. | 250/227 |
| 4,639,130 | 1/1987 | Koike et al. | 356/73.1 |
| 4,721,859 | 1/1988 | Lewis | 250/227 |

Primary Examiner—David C. Nelms
Assistant Examiner—Stephone B. Allen
Attorney, Agent, or Firm—Stanger, Michaelson, Reynolds, Spivak & Tobia

[57] ABSTRACT

A noncoherent fiber optic bundle is made coherent by relating the positions of fiber ends in the exit field to the consecutive positions of an initialization beam of light moving in the entrance field. The initialization beam is small compared to the fiber size and is moved along a path in the entrance field in a manner to intersect the entrance ends of the fibers. A sensor array to which the exit field is coupled is interrogated each time the beam is moved to determine which sensors in the array are activated for each incremental position of the beam. The computer stores the address at which the first activation of a sensor occurred, and the address at which a once-activated sensor is no longer activated (turned off). The computer also associates that sensor with the mean beam position between those two addresses. No determination is made as to the positions of the entrance ends of the fiber in the entrance field. The method and apparatus are useful for coherent bundles as well.

9 Claims, 5 Drawing Sheets

OPTICAL FIBER INITIALIZATION METHOD AND APPARATUS

FIELD OF THE INVENTION

This invention relates to fiber optic bundles, and more particularly to a technique for establishing the relationship between the ends of the fibers in the entrance field of a fiber optic bundle and the associated fiber ends in the exit field of the bundle.

BACKGROUND OF THE INVENTION

Co-pending application, Ser. No. 581,085; now U.S. Pat. No. 4,674,834 of George D. Margolin, filed Feb. 17, 1984, and assigned to the assignee of the present application, discloses an initializing technique for making a noncoherent optical fiber bundle "coherent" electronically. The initializing technique called for moving a light beam, having a dimension small compared to the size of a fiber, along a path which intersects the fiber ends in the entrance field. An optical sensor array is abutted against the exit field and interrogated each time the light beam is moved to determine which sensors of the sensor array are illuminated each time the beam is moved. In this manner, the light beam merely needs to be moved in increments rather than being required to be moved to predetermined positions in the entrance field.

The sensor array includes many sensors (i.e. 65,000) compared to the number of fibers. Consequently, each fiber overlies more than ten sensors. A procedure is described for choosing a single unique sensor for each end in the exit plane.

Co-pending application, Ser. No. 894,792, filed Aug. 8, 1986, also for George D. Margolin and assigned to the assignee of the present application discloses an initializing procedure which records the position of each sensor first activated each time a beam, in the form of a narrow slit of light, is moved. A computer stores the addresses of the activated sensors until the beam reaches a point along the path where a sensor is no longer activated. For each position of the beam, all the activated ssensors are plotted. The number of activated sensors is compared for several sequential positions of the beam. A maximum in the number ofactivated sensors for such a sequence of positions and a selected sensor in that maximum is taken as the position of the corresponding fiber end in the exit field to the position of the light beam.

There are two caveats to this procedure. The first is that the fibers in the exit field are in random positions. Thus, for each position of a beam, sensors may be activated in several areas of the sensor array. This is because the beam may be in a position to send light through more than one fiber when the sensor array is interrogated. Thus, the maximum which is sought above, is a maximum in the number of activated sensors in one area of the sensor array.

The second caveat is that the fibers in the entrance field are not organized in predetermined positions. That is to say, the exact positions of a particular fiber in the entrance field is not known. Even for an ideally linear entrance field, some fibers may be offset laterally from the axis of the field. Others may be touching one another while still others are spaced apart in non-uniform distances. Still others may be bunched together. It is not necessary to move the beam to exact predetermined positions for each fiber. That would be a very time-consuming and expensive procedure. It is only necessary to move the beam incrementally along a path and to interrogate the sensor array in the manner described above.

The foregoing initializing procedure requires the computer to make several computations after each interrogation of the sensor array. Such computations require time for each position of the beam. For fiber optic array of interest there are thousands of fibers. Thus, the amount of time required for initializing an array is relatively high. Although the cost of initializing is low, still for low cost scanner applications particularly, a faster initializing procedure would be very attractive.

BRIEF DESCRIPTION OF THE INVENTION

In accordance with the principles of the present invention, the initializing system is adapted to record the first time a given sensor is activated at each position for the slit as the slit is moved. If a sensor is deactivated at a given position of the slit that occurrence also is recorded. The system thus is adapted to record, for each sensor, the slit position at which the sensor was first illuminated and the slit position at which the sensor was last illuminated.

The system also may be adapted to discard any sensor the width of illumination of which is greater than a defined threshold number. This procedure determines the resolution of the system.

DETAILED DESCRIPTION

Figure 1:
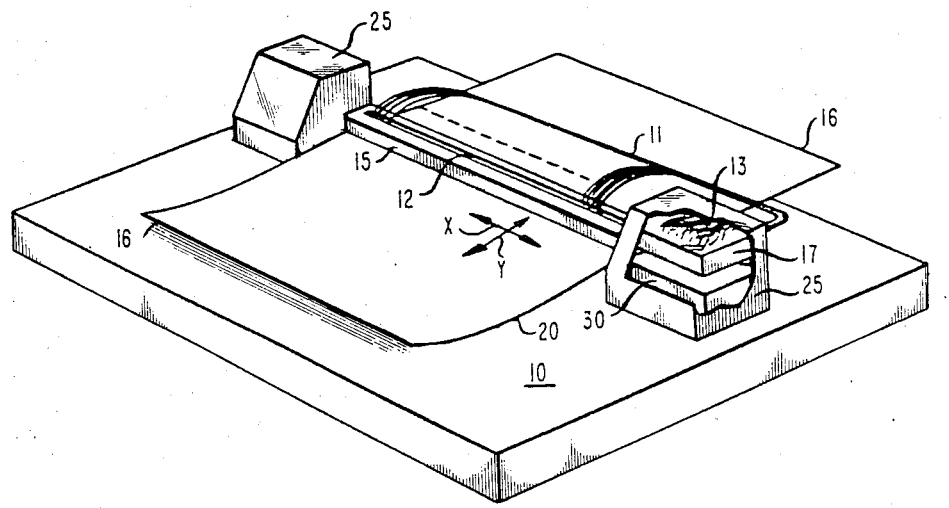
FIGS. 1, 3, 4, and 5 are schematic representations of portions of a scanner initialized in accordance with the principles of this invention.

FIG. 1 shows a illustrative portable graphics input device 10 in accordance with one aspect of this invention. The device comprises an optical fiber bundle 11 having first and second ends 12 and 13, respectively. The ends of the fibers at 12 are constrained, by ferrule 15 into a linear array positioned for scanning successive linear segments or lines of an image when moved with respect to a document 16, for example, along an axis aligned with double-headed arrow Y. These ends of the fibers constitute the entranc field of the fiber bundle.

The ends of the fibers at 13 are not organized, but rather are gathered and bunched randomly, and fused. The fused bundle is abutted physically or focussed optically onto the surface of a Random Access Memory (RAM) 17 which constitutes a sensor array. The diameter of each fiber is chosen to be large compared to the area of a sensor in the array, so that twelve or so sensors (bits) of the array correspond to each fiber at end 13. The choice of size ensures that any light entering a fiber at end 12 impinges at least one usable sensor or bit location of the array when it exits at end 13.

Coherence, that is, the ordered relationship, between the light signals entering the linear array of fibers at end 12 and light exiting the fibers at the bundled end 13 ispprovided by storing, in a Look-up Table in a computer, or by a Programmable Read Only memory (PROM), the address of a sensor in array 17 which senses light exiting a particular fiber at end 13 as light ideally is directed into each of the fibers at end 12 in sequence.

Figure 2:
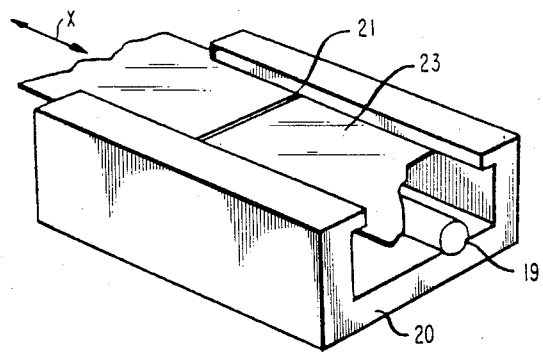
FIG. 2 is a schmmatic representation of a portion of an initializing apparatus in accordance with the principles of this invention.
Figure 3:
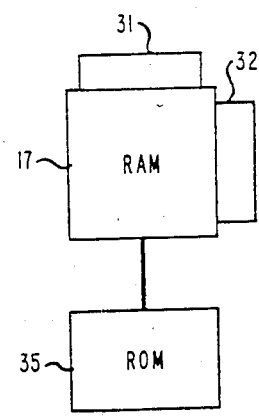

Initialization of an embodiment such as that shown in FIG. 1 is illustrated by the apparatus of FIGS. 2 and 3. The apparatus includes a light source 19 enclosed by housing 20. A side of housing 20 in FIG. 2 is placed adjacent to ends 12 of FIG. 1 during an initialization process. The side 20 includes a slit 21 which, for example, may be formed in an opaque film or tape 23 which is moved along an axis, represented by double-headed arrow X in FIGS. 1 and 2, in a manner to expose the fibers of the linear array at end 12, in sequence, to light. This causes the illumination of a sequence of sensors in array 17 of FIG. 3, corresponding to the sequence of fibers illuminated in the linear array.

Slit 21 is narrow (having a dimension of less than a fiber diameter) and is progressively moved along the linear array in synchronism with the interrogation of array 17, so that the bit map of each fiber is individually read out and recorded. The arrangement for moving slit 21 as required may be any convenient translation mechanism suitable for this purpose, and a detailed discussion of such an arrangement is not necessary for an understanding of this invention. All that is necessary is that a slit be moved (in increments of less than a fiber width) along the fiber ends at 12 to illuminate the fibers in sequence to establish an appropriate Look-up Table or Bit Map during an initialization procedure. A suitable control circuit for controlling the incremental movement of slit 21 and for controlling source 19 is represented by circuit board 30 in FIG. 1. The apparatus to accomplish initialization can be included as part of the apparatus of FIG. 1, or may be a separate dedicated fixture as shown in FIG. 2.

Array 17 includes X and Y address decoders 31 and 32 in a familiar manner as indicated in FIG. 3. All sensors in array 17 are initialized or precharged prior to each "interrogation" cycle, in which all sensors are interrogated to determine the address of any sensor which was illuminated when light moves to the next consecutive position during the initialization process. Specifically, incident light discharges the sensors of the array corresponding to the fiber at end 12 which is illuminated at any given slit position during the initialization process. The array is then interrogated and the address (or addresses) of the discharged sensors (or sensors) is stored in the Look-up Table or Read Only memory (ROM) 35 under the control of control circuit 30 of FIG. 1. At the termination of the initialization process, the addresses of all the consecutively discharged sensors of array 17 are stored. This procedure of incremental slit movement and/or interrogation of the array at regular intervals, imposes an incremental pattern to the initialization procedure which obviates the need for the exact positioning of the initializing beam with respect to each fiber position. The procedure thus establishes the coherence between the randomly gathered fiber ends at exit field 13 and the linear arrangement of fiber ends at entrance field 12 and the system is now ready for operation.

The sensor array need not be accessed on a random access basis. A charged couple device (CCD) or charge injection device (CID) can be used instead. It is important that the sensor array be interrogated as disclosed herein to generate a sequence (string) of significant addresses which constitute a subset of the totality of addresses in the sensor array and that that string constitutes the only addresses interrogated during a later scan period (in the case of a RAM or CID) or the only addresses which are taken as valid out of the serial output stream of a CCD.

As noted, each fiber, preferably, is larger in diameter than the area occupied by a group of sensors in the sensor array. This relationship ensures that at least one unambiguous sensor in the array will be illuminated during each interrogation cycle, and that a defect in the array will not caus loss of information. The redundancy of about 10 to 20 sensors, corresponding to a single fiber, was selected for convenience because of the economy and availability of 64K RAMs (sensor arrays), and the excellent resolution, economy and general utility of the device using 2 mil fibers. A lower level of redundancy may be chosen, without sacrificing required resolution by varying the RAM size or geometry, the fiber size, or other parameters.

A suitable sensor array (RAM) for the embodiment disclosed is available commercially from Micron Technology, Inc., of Boise, Id. The RAM is divided into two sections, each 256 by 128 cells. Accordingly, it is convenient in the illustrative embodiment to divide the fibers at end 13 into two arrays to associate with the two sections of the RAM if the Micron Technologies RAM is used. An appended appendix describes in detail the address structure of the Micron Technology IS32 Optic RAM and circuitry for its use. For speed of operation, it may be desirable to divide the fibers into a greater number of sections to reduce the addressing requirements.

A complete system for entering graphics information into a computer using such a sensor RAM is disclosed in detail in the September 1983 issue of Byte Magazine at pp. 20–31, the computer interfaces and control software for the system are described in the October issue of that same publication at pp. 67–86. The present invention can be used with the system described in those publications, by providing, in addition, the herein-described fiber optic array, a sensor array, and a memory for storing a Look-up Table or Bit Map preferably in the form of an address string comprising the sequence of selected sensor addresses obtained during initialization.

Figure 4:
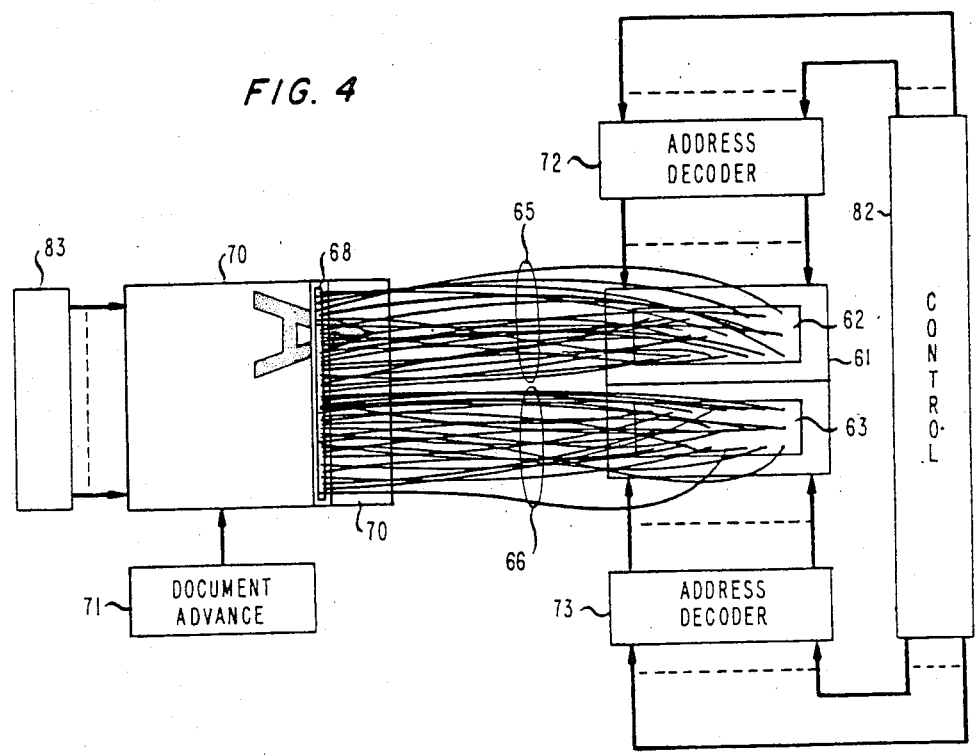

FIG. 4 shows schematically an arrangement of the type shown in FIGS. 1 and 3 for use with the system of the above-mentioned publications. The arrangement includes sensor chip 61 divided into two sections 62 and 63 as is available commercially. Sections 62 and 63 are mated with randomly-bundled fiber arrays 65 and 66, respectively. The other ends of the fibers are constrained to a linear geometry by ferrule 68 and positioned to scan a portion of a document, shown by way of illustration as the letter A on document 70. A means for advancing document 70 is represented by block 71 and may comprise, for example, a mechanism like that used in the Houston Instruments DMP-4 plotter. Houston Instruments is a division of Bausch & Lomb. Chip 61 is addressed by address decoders 72 and 73 under the control of a Look-up Table implemented as part of a computer or by a familiar PROM providing a bit map. The addressing control arrangement is represented by block 82.

Figure 5:
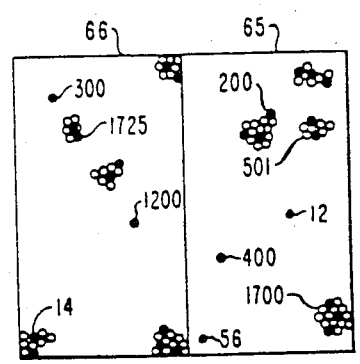

The linear array in FIG. 4 is shown intersecting a letter "A" on document 70. In the absence of a Look-up Table or Bit Map, non-coherence between the input and output array produces a random distribution of the light signals input to the linear array of fibers. That distribution is shown as it appears from the output as represented in FIG. 5. FIG. 5 specifically, represents the random distribution by numbers of associated fibers in the linear array placed with respect to possible positions of the associated other ends of those fibers in array sections 62 and 63. It is clear that the interrogation of RAM sections 62 and 63 could make no sense of the input signals in the absence of a Look-up Table.

But a Look-up Table or Bit Map which stores the relationship between the input of fibers 1,2,3, . . . and the addresses in chip 61 associated with the output ends of those fibers, would enable sense to be made of the random distribution by controlling the chip address decoders to take the output sensed at the stored addresses in a sequential relationship identical to that in the linear array. Consequently, during a scan period when light directs signals into the fibers at 68 in FIG. 4 from a linear segment of the document, the Look-up Table or Bit Map 82 of FIG. 4 applies a sequence of addresses to interrogate the memory in order to generate output signals coherent with the fiber positions at 68. Next, document 70 is advanced incrementally with respect to ferrule 68, and chip 61 is interrogated again in accordance with the sequence of stored addresses. The process is repeated until the document is entirely scanned. The apparatus of FIG. 1 is assumed to include a lamp (not shown) for illuminating the document. Provision for illumination may correspond to that provided in any familiar copier. The illumination means is represented by block 83 in FIG. 4.

The following Table 1 represents a Look-up Table or Bit map for an illustrative six fibers. It should be clear that the operation of the senso interrogation according to the Look-up Table during each scan period is entirely consistent with the operation described in the above-mentioned publications. But the results are considerably different because the optical input received by the sensor array (chip 61) during each interrogation is effectively a randomly dissected linear input distributed over the entire sensor array instead of a line from the array being laid out on a line of the sensor, as it would be in the case of a direct lens projected image. It is clear that resolution is significantly improved.

| Look-up Table Fragment Diagram | |
|---|---|
| Input Array Fiber | Output Array Associated RAM Address |
| 507 | 4122 |
| 508 | 73 |
| 509 | 2413 |
| 510 | 62117 |
| 511 | 12540 |
| 512 | 989 |

The input fiber numbers shown, constitute, illustratively, a fragment taken from the 0–3000 sequence of fibers and shows one related sensor address for each fiber. The sensor addresses are chosen, illustratively, from the 10 or 20 addresses corresponding to a given fiber in such a way that the chosen address for each fiber is at least 20 cells away from the address of nearby fibers.

The operation of a scanner embodying the principles of this invention can be understood by proceeding as follows: First the linear end of the fiber bundle is juxtaposed with a first line (or linear segment) of a document to be scanned. A light source illuminates the document (possibly by being strobed), and the storage means for storing the address sequence is activated for applying the sequence of addresses to the sensor array in order to read the incoming light signals (presence or absence of light) in each of the sequence of fibers corresponding to the sequence of addresses interrogated. Since the generated sequence of addresses corresponds to the sequence of fibers in the linear end of the bundle, the light signal outputs are coherent. These output signals are stored in memory, or transmitted, or both, in a manner entirely consistent with the teachings of the above-mentioned Byte Magazine articles.

The initialization procedure is directed at choosing the address string (or sequence) applied during each scan period. Remember that during the initialization procedure for each position of the initializing beam say 10–15 sensors are activated. If the beam is between fibers, those sensors could be positioned in two separated areas of the sensor array. Nevertheless, for each beam position we get 10–15 activations and one or more of those may be a first activation.

The initializing beam is now moved. Ten to 15 sensors again are activated. Some of those are repeats. If the beam is over a single fiber end in the entrance field when in this new position and between fibers in the next previous position, a number of sensors in one area of the chip will not be activated while others in a different area will be activated. The deactivation is recorded. Those sensors that are activated again are still retained as "on" by the computer.

The beam is now moved a few more times. Say the beam moves through several positions corresponding to a single fiber. The sensors still retained as "on" stay on. Consider what happens when the beam moves past this fiber to a position between fibers. The "on" sensors will begin to turn off. That is to say, they will not be activated for that new position of the beam. At some position, all the sensors first activated for one in a sequence of beam positions will not be activated during a later one of those positions. The sensors so determined are related to the sequence of beam positions. Note that these beam positions do not necessarily relate to the positions of the entrance ends of the fibers and certainly do not relate to any known positions of the fibers in the entrance field because those positions are not known or predetermined in any way.

For further movement of the beam, previously activated sensors may be activated a second time. This event is not recorded. Only when a sensor, once activated is later turned off is that relationship of first activated-later turned off sensors important.

For some positions of the beam, a sensor previously determined to be activated will be activated again. As was mentioned above, this second activation is not recorded. The fact that a particular sensor is no longer activated as the beam moves gives us information as to the relationship between the sensors and the beam positions. Specifically, the sensors once turned on and once turned off are excluded from further consideration because their relationships to beam positions is fully determined.

But those sensors remaining activated are associated with the beam position at which the sensors first turn off. A reference number of beam positions is established depending on beam and fiber size. Turn on must have occurred within that reference number of beam positions for the turn off to be taken to correspond to a beam position.

Figure 6:
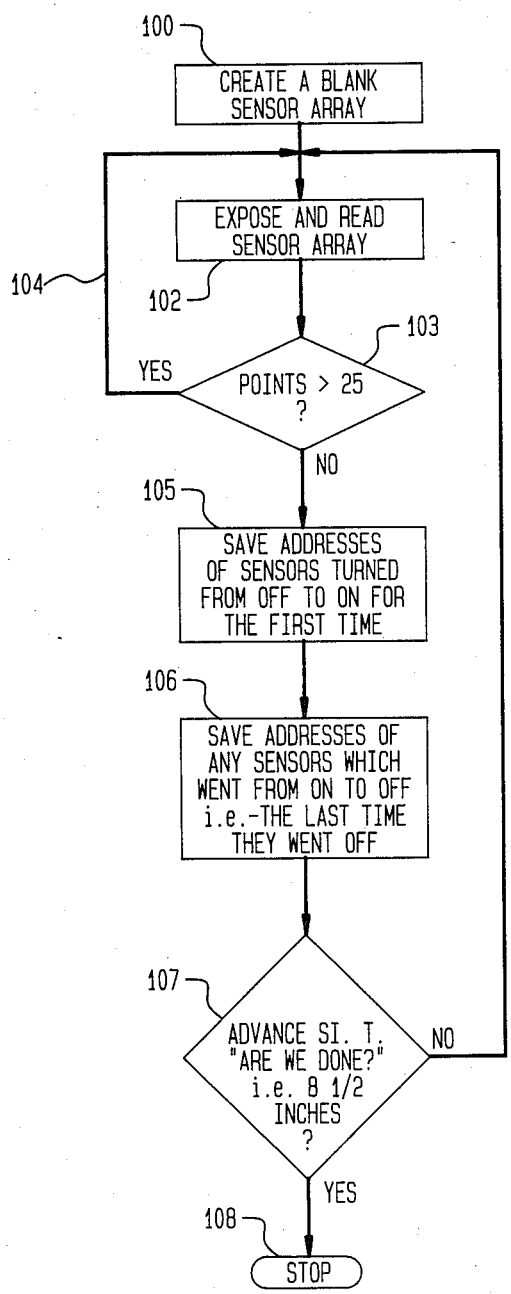
FIGS. 6, 7, and 8 are flow diagrams of the operation of the computer during initialization herein.

The computer program for achieving initialization in this manner is provided in an appendix hereto in a form which should be understandable by any programmer familiar with for example, the C Programming language. The operation of the program is described in connection with the flow diagram of FIG. 6 as follows:

FIG. 6 shows a flow diagram for the method for automatically gathering position data stored in memory (256K array) during the initialization procedure. Block 100 indicates that the data gathering process starts with the creation of a blank sensor array. The blank sensor array is exposed at a defined exposure level and read out to obtain outputs representative of which sensors were illuminated and which were not. This step is indicated by block 102 of FIG. 6.

Block 103 indicates an error check to see if more than an arbitrary number (25) of sensors have been illuminated for the first time. Practice has indicated that if a greater number has been illuminated, overexposure occurrs and probably an error occurred. Another exposure should be taken. This is indicated by arrow 104 back to block 102. If the arbitrary number is not exceeded, the operator proceeds to block 105. Block 105 indicates that the addresses of the newly-turned on sensors are saved.

Block 106 indicates that the addresses of any sensors which go from on to off during the interrogation after exposure are also saved. This information is updated during each exposure cycle so that information as to the last occurrence of a sensor going from on to off is saved. A comparator is used conveniently for this purpose, newly acquired address data being compared to prior data. That information defines the broadest effect of light from a single slit position and thus ultimately defines the resolution for the system.

Next, the slit is incremented to the next position as indicated by block 107. If a sufficient number of slit increments has occurred to cover the width of the entrance field (i.e. 8½ inches for a normal document), the operation stops as indicated by block 108. Otherwise, the operation returns to block 102 as indicated by arrow 110.

The procedure of the flow diagram of FIG. 6 is implemented at arrow 115 of the program of the appendix. All the statements in the appendix prior to arrow 115 are definitions to tell the compiler what exists in the way of definitions and how big (as to number of bits or bytes). For example, at arrow 116, the term—long soak=0;—indicates a 32-bit number, which has an initial value of zero. At arrow 117, the term—lnt msp=0;—indicates the most significant position for the slit.

Figure 7:
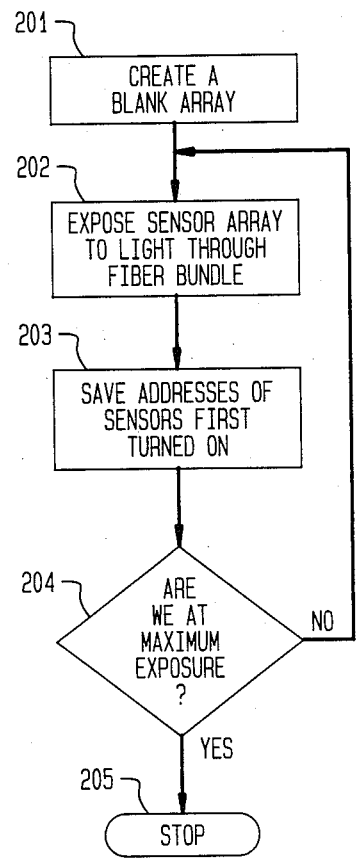

FIG. 7 shows a flow diagram for obtaining the sensitivity data for a particular fiber bundle and energy-coupled sensor array. Such information is stored in a 64K memory. In the typical system each fiber covers about twelve sensors. During the operation to obtain the sensitivity data about 30,000 sensors (out of 65,000) are affected.

Again, the sensitivity data acquisition commences with creating a blank sensor array as indicated in block 201. The next step is to expose the sensor array to light through the entire fiber bundle as indicated by block 202. The addresses of all sensors first turned on during the exposure are saved as indicated by block 203.

A decision point is indicated at block 204. If the last exposure was a maximum (all sensors are turned on), operation stops as indicated by block 205. If not, the operation returns to block 202 as indicated by arrow 206 and the exposure is increased a preset amount. Typically sixteen exposures are used from a low of one millisecond to a maximum of five milliseconds. The sensitivity data gathering is indicated at arrow 208 in the appendix.

Figure 8:
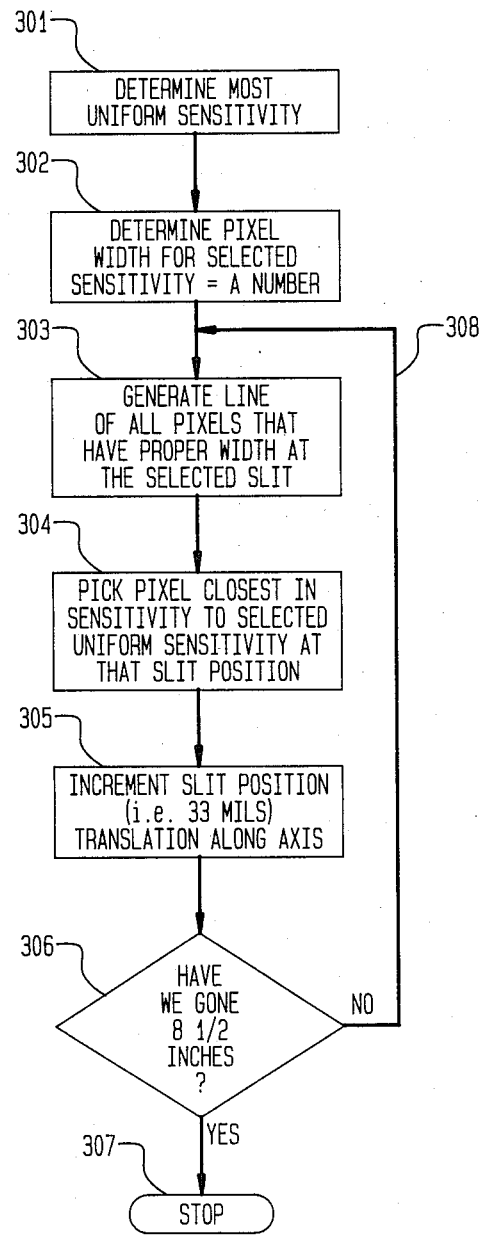

FIG. 8 is a flow diagram of the computer operation to determine the resolution map from the data obtained by the operations described in connection with FIGS. 6 and 7. At this juncture, the pixels are already characterized as to sensitivity and position. The operation described in connection with FIG. 8, picks the sensors for a given resolution (i.e. 480 bpi).

The resolution map is generated by first determining the addresses of the sensors (and fibers) with the most uniform sensitivity. This is indicated by block 301 of FIG. 8 and entails multiple exposure at incrementally higher exposure levels. The range of the effect of radiation through a fiber at each exposure level is determined. This step is to determine if the effect extends beyond a predetermined pixel width as indicated by block 302. The width is represented by a number corresponding to a preset number of sensors (i.e. 25 sensors—above).

The next step is to generate a list of sensor addresses (pixels) which fall within the defined pixel width of block 302 at the corresponding slit position. This step is indicated by block 303.

The next step is to pick the sensor (pixel) closest in sensitivity to the selected uniform sensitivity at that slit position as indicated by block 304. The slit position is then incremented (3.3 mils in the experimental system having 30 mil fibers) along the axis of the entrance field. This step is indicated by block 305.

If the slit has been incremented sufficiently to have traversed an 8½ inch entrance field (of the experimental system) as indicated in block 306, the operation stops as indicated by block 307. If not, operation continues as described in connection with block 303 as indicated by arrow 308.

The entire program for the flow diagrams of FIG. 6, 7 and 8 ends at the double lines referenced by arrow 310 in the appendix. All terms in the portions of the appendix following those double lines are subroutines for the instructions in the program. The instruction at arrow 208 of the appendix is for operations of FIG. 6 and 7. The instruction at arrow 311 of the appendix is for the operation of FIG. 8.

The program format as well as that of the definitions and subroutines are written in the C-language and should be understood easily by one skilled in that programming language.

The invention had been described in terms of a non-coherent fiber optic bundle. It should be apparent that the initialization procedure described is also useful with coherent fiber bundles, as well as any sets of radiation conduits, coherent or non-coherent, which couple to an array of discrete sensors at their exit fields.

It should also be understood that the initializing procedure is described in terms of a narrow slit of light (radiation). But such a light source need not be a slit. It could be a beam from a laser. Such a beam would be particularly appropriate for initializing fiber bundles which have non-linear entrance fields such as is the case with scopes.

Appendix

```c
#include "stdlib.h"
#include "paulcs.h"
#include "xkeys.h"
#include "math.h"
#include "time.h"

#define max_width 8400000
#define steps     78   /* 1 step=(1/78400)" */
#define step_dist (int)(steps/.0784+.5)

int  initialize(void);     /* Initialize the program */
void crunch(void);         /* Perform the necessary data manipulation */
void update(void);         /* Update the screen with vital information */
void screen(void);         /* Display Array information on the screen */
void array12(int,int);     /* Display an array on the screen */
char keyboard(void);       /* Check keyboard for commands */
char enter_soak(void);     /* Get a new soak time */
void error(int);           /* Display error condition */ long soak=0;               /* Exposure time for reading array */    ← 116
long position=0;           /* Position of the slit on the array */
int  msp=0;           ← 117 /* MS position of slit */
int  lsp=0;                /* LS position of slit */
int  left=1;               /* Left display "NEW" */
int  right=5;              /* Right display "ALL" */
int  display=1;            /* Control flag for screen display */
char *ary_new;             /* 8K array of the "new" read */
char *ary_old;             /* 8K array of the last "new" read */
char *ary_on;              /* 8K array of first "on's" */
char *ary_off;             /* 8K array of last "off's" */
char *ary_all;             /* 8K array of all "on" points */
unsigned pnts_new=0;       /* Number of new points */
unsigned pnts_old=0;       /* Number of old points */
unsigned pnts_on=0;        /* Number of new "ON" points */
unsigned pnts_off=0;       /* Number of new "OFF" points */ main(argc,argv)
int argc;
char *argv[];
   {
   char c=0,map_file[15],*t;
   int n=0;

if(xscan()==0) error(1);  /* Check if scanner card is installed */
   else
      {
      allmem();

if(strlen(argv[1])) strmfe(map_file,argv[1],"smp");
      else strmfe(map_file,"fiber","smp");
      upper_case(map_file);

115→ if (initialize())
        {
208→    if (((pnts_new=xsnap(soak,ary_new,0,0))<25)||(n>3))
           {
311→       crunch();
           update();
           t=ary_new; ary_new=ary_old; ary_old=t;
           pnts_old=pnts_new;
           position+=step_dist;
           msp=position/1000000; lsp=position/1000-msp*1000;
           xstep(steps,8); zstep();
           n=0;
           }
        if (kbhit()) c=keyboard();
        n++;
        } while ((position<max_width)&&(c!=ESC));

if (c!=ESC) save_map(map_file);
```

```
      do { c=getch(); } while (c!=ESC);
      }

}
    rstmem();
  }
                                                          ┌── 310
                                                          ↓
/* ==================== Initialize the Program ======================== */
int initialize()
{
  if ((ary_new=calloc(8192,1))==0)   { error(2); return(0); }
  if ((ary_old=calloc(8192,1))==0)   { error(3); return(0); }
  if ((ary_on=calloc(8192,1))==0)    { error(4); return(0); }
  if ((ary_off=calloc(8192,1))==0)   { error(5); return(0); }
  if ((ary_all=calloc(8192,1))==0)   { error(6); return(0); }
  if (init_map()==0)                 { error(7); return(0); }
  xmode(1,0);
  return(-1);
}

/* ============== Perform the necessary data manipulation ============= */
void crunch()
{
  cpu_pts(ary_new,ary_old,ary_on,ary_off,ary_all);
  pnts_on=pts_on(ary_on,position);
  pnts_off=pts_off(ary_off,position);
  {
    char c;
    c=getch();
    if(c!=0)
    {
      if(((c>='0')&&(c<='9'))||(c=='.'))
      {
        ungetch(c);
        c=enter_soak();
      }
      else switch(c)
      {
        case '+': display=1; break;
        case '-': display=0; break;
        default:             break;
      }
    }
    else
    {
      c=getch();
    }
    return c;
```

What is claimed is:

1. An initializing method for determining the associated positions of ends of a bundle of conduits of electromagnetic radiation in an exit field with respect to light entering the entrance field of the bundle, said method comprising the steps of moving incrementally a beam of light having a dimension small compared to the size of one of said conduits, coupling said exit field to a sensor array having an array of discrete sensors, interrogating said array for each incremental movement of said beam along said path, storing the address of each sensor newly activated during each interrogation, and storing the address of each newly activated sensor which becomes deactivated when the beam is moved to a consecutive position along said path.

2. A method in accordance with claim 1 also including the steps of determining the mean beam position between that at which the address of a sensor newly activated occurred and the address when the deactivation of that sensor occurred, associating the address of each sensor newly activated then later deactivated with said mean position.

3. A method in accordance with claim 2 wherein each of said conduits comprises an optical fiber and said fiber couples a plurality of said sensors.

4. A method in accordance with claim 3 also including the step of deselecting from further recording the address of any sensor once activated.

5. A method in accordance with claim 3 also including the step of establishing a reference number of consecutive beam positions against which the establishment of an once activated-later turned off relationship can be compared for acceptance, and associating the addresses of accepted such relationships with the beam positions within such reference number.

6. An initializing method in accordance with claim 5 wherein said sensor array comprises an optically responsive random access memory.

7. An initializing method in accordance with claim 5 wherein said sensor array comprises a CCD.

8. Apparatus for initializing a plurality of fibers for transmitting electromagnetic radiation from ends thereof in an entrance field to ends thereof in an exit field, said apparatus comprising means for moving a beam of radiation along a path in a manner to intersect said ends in said entrance field consecutively, said apparatus including a discrete sensor array coupled to said exit field, means for interrogating said sensor array to obtain addresses of illuminated sensors in said array for each incremental movement of said beam where the increments are smaller than the width of said fibers, and means for storing the addresses of sensors first activated and first deactivated during said beam movement along said entire path.

9. Apparatus in accordance with claim 8 wherein said fibers are optical fibers for transmitting light.

* * * * *